(12) United States Patent
Hartman et al.

(10) Patent No.: US 7,535,480 B2
(45) Date of Patent: May 19, 2009

(54) COMPOSITING RENDERING LAYERS

(75) Inventors: Jason H. Hartman, Woodinville, WA (US); Christopher N. Raubacher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 11/211,871

(22) Filed: Aug. 24, 2005

(65) Prior Publication Data

US 2007/0052722 A1  Mar. 8, 2007

(51) Int. Cl.
G09G 5/00 (2006.01)
G06F 17/00 (2006.01)
G06T 1/00 (2006.01)
G06T 15/00 (2006.01)

(52) U.S. Cl. .................. 345/629; 345/419; 345/619

(58) Field of Classification Search ............. 345/418, 345/619, 629
See application file for complete search history.

(56) References Cited

U.S. PATENT DOCUMENTS

| | | | | |
|---|---|---|---|---|
| 5,481,669 A * | 1/1996 | Poulton et al. | ............. | 345/505 |
| 5,581,670 A * | 12/1996 | Bier et al. | ............. | 715/856 |
| 5,617,114 A * | 4/1997 | Bier et al. | ............. | 345/634 |
| 5,867,166 A * | 2/1999 | Myhrvold et al. | ............. | 345/419 |
| 5,870,098 A * | 2/1999 | Gardiner | ............. | 345/426 |
| 5,883,627 A * | 3/1999 | Pleyer | ............. | 345/629 |
| 6,031,529 A * | 2/2000 | Migos et al. | ............. | 715/783 |
| 6,177,945 B1 * | 1/2001 | Pleyer | ............. | 345/473 |
| 6,369,830 B1 * | 4/2002 | Brunner et al. | ............. | 345/629 |
| 6,570,578 B1 * | 5/2003 | Smirnov et al. | ............. | 345/629 |
| 6,601,057 B1 * | 7/2003 | Underwood et al. | ............. | 707/1 |
| 6,639,594 B2 * | 10/2003 | Zhang et al. | ............. | 345/426 |
| 6,717,584 B2 * | 4/2004 | Kulczycka | ............. | 345/589 |
| 6,734,873 B1 * | 5/2004 | Herf et al. | ............. | 345/629 |
| 6,919,891 B2 * | 7/2005 | Schneider et al. | ............. | 345/440 |
| 7,071,937 B1 * | 7/2006 | Collodi | ............. | 345/426 |
| 7,106,343 B1 * | 9/2006 | Hickman | ............. | 345/589 |
| 7,403,209 B2 * | 7/2008 | Liao et al. | ............. | 345/629 |
| 7,474,314 B2 * | 1/2009 | Minchew et al. | ............. | 345/581 |
| 2003/0085904 A1 * | 5/2003 | Kulczycka | ............. | 345/581 |
| 2003/0132937 A1 * | 7/2003 | Schneider et al. | ............. | 345/473 |
| 2003/0197716 A1 * | 10/2003 | Krueger | ............. | 345/629 |
| 2004/0015610 A1 * | 1/2004 | Treadwell | ............. | 709/246 |
| 2004/0039934 A1 * | 2/2004 | Land et al. | ............. | 713/200 |
| 2004/0075699 A1 * | 4/2004 | Franchi et al. | ............. | 345/860 |
| 2005/0060759 A1 * | 3/2005 | Rowe et al. | ............. | 725/143 |
| 2005/0132305 A1 * | 6/2005 | Guichard et al. | ............. | 715/855 |
| 2005/0243086 A1 * | 11/2005 | Schechter et al. | ............. | 345/420 |
| 2006/0066925 A1 * | 3/2006 | Hasegawa et al. | ............. | 358/518 |

OTHER PUBLICATIONS

Adob Photoshop 7.0: Classroom In A Book; Adobe Systems, Inc.; ISBN 0-321-11562-7; 2002.*
Kirupa.com; "Changing Colors Using ActionScript;" Feb. 21, 2003; printed pp. 1-4; http://web.archive.org/web/20030221152014/http://www.kirupa.com/developer/actionscript/color.htm.*

* cited by examiner

Primary Examiner—Kee M Tung
Assistant Examiner—Crystal Murdoch
(74) Attorney, Agent, or Firm—Workman Nydegger

(57) ABSTRACT

Aspects of the subject matter described herein relate to applying effects to a target via compositing rendering layers. In aspects, an intent is determined and a area of a target copied to a surface based on the intent. Then, rendering may continue to the target without changing to another target. Later, the surface is composited back to the target to apply an effect to the target.

14 Claims, 4 Drawing Sheets

COMPOSITING RENDERING LAYERS

BACKGROUND

Graphics systems may be used to rasterize scenes to a computer display. Such systems may expose application programming interfaces (APIs) that allow a program to access specialized hardware features such as video card features that provide faster or specialized rendering. In rendering a scene, objects may be rendered to a target. To apply an effect to some portion of rendering, programs often switch the rendering target to an intermediate target and then apply the effect when compositing the intermediate target to a final target. In many graphics systems, switching targets is an expensive operation and may further degrade performance by causing cache thrashing.

SUMMARY

Briefly, aspects of the subject matter described herein relate to applying effects to a target via compositing rendering layers. In aspects, an intent is determined and an area of a target copied to a surface based on the intent. Then, rendering may continue to the target without changing to another target. Later, the surface is composited back to the target to apply an effect to the target.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
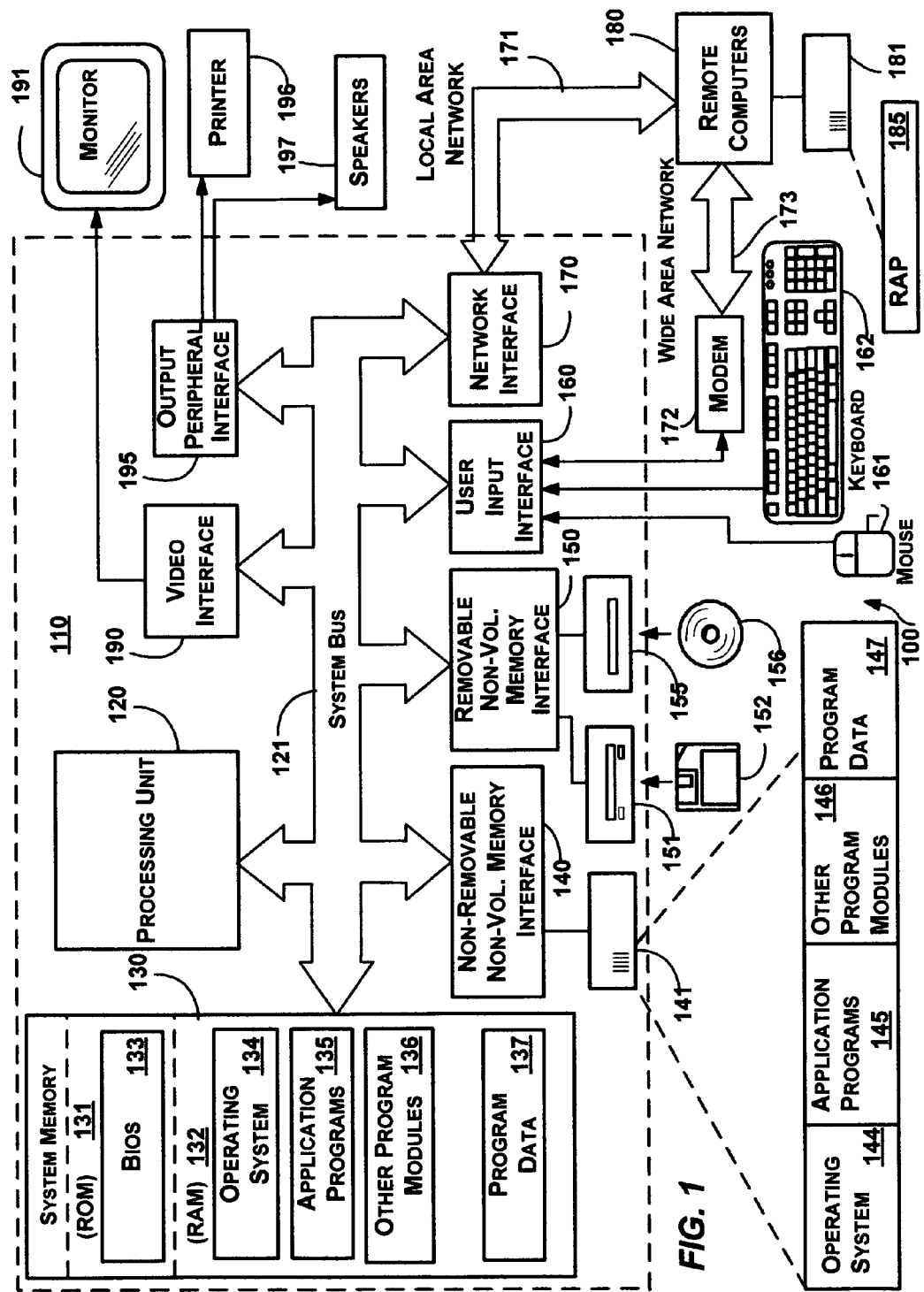
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to a non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Compositing Rendering Layers

Figure 2A:
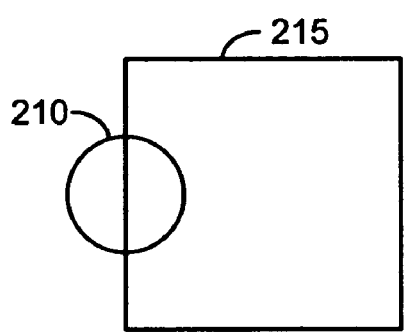
FIG. 2A is a block diagram representing a layer to render in accordance with aspects of the subject matter described herein.

FIG. 2A is a block diagram representing a layer to render in accordance with aspects of the subject matter described herein. The layer may include a square 215 and a circle 210 (hereinafter sometimes referred to as "objects"), for example.

A layer may include objects of a graphics scene that are to be manipulated collectively, particularly, when individual manipulation on the objects of the layer may produce undesirable results. For example, depending on the Z ordering of the objects 210 and 215 and their transparencies, applying an effect of transparency to the objects 210 and 215 individually and sequentially may result in a different rendering than applying the transparency to the layer. For example, if a transparency of 60% is applied to each of the objects 210 and 215, the area within the intersection of the circle 210 and the square 215 may be rendered with one color if the circle 210 is rendered before the square 215 and with another color if the square 215 is rendered before the circle.

In addition, if it is desired to have whatever is drawn behind the layer show through the objects 210 and 215 at 50%, for example, and each of the objects 210 and 215 is assigned a transparency of 50%, then rendering the objects 210 and 215 individually and blending transparencies may cause the area of the circle 210 that is within the square 215 to have a transparency of 25%. This may cause less of whatever is drawn behind the layer to show through than desired.

Figure 2B:
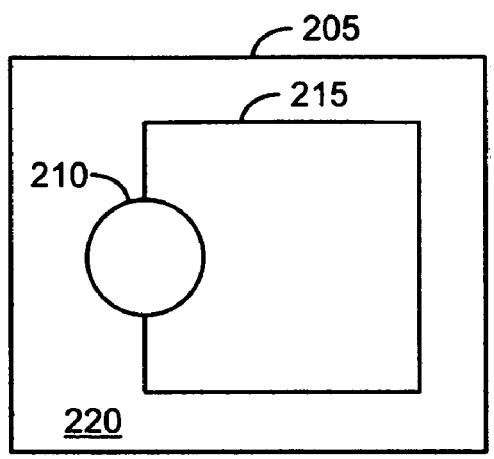
FIG. 2B is a block diagram representing a surface upon which a layer has been flattened or an area copied from a target in accordance with aspects of the subject matter described herein.

To address this problem, the objects 210 and 215 may be flattened into a surface (e.g., treated as if both lie in the same plane) as shown in FIG. 2B, which is a block diagram representing a surface upon which a layer has been flattened or an area copied from a target in accordance with aspects of the subject matter described herein. A transparency effect may then be applied to the foreground objects of the surface 205 (e.g., the objects 210 and 215) such that the area occupied by the foreground objects has a specified transparency. In addition, the background 220 may be set as totally transparent to cause whatever the background 220 is placed over to show through the background 220. This is useful when rendering the surface 205 into a target as a fully transparent background 220 may not cause any changes in the target where the background 220 is rendered.

Switching targets, however, from the main target to the intermediate target may cause performance degradation as previously mentioned. In order to avoid state changes that result from changing the target from the target 225 to a target including the surface 205, a copy of an area on the target 225 may be obtained and stored in memory (sometimes called a surface). After the copy is obtained, rendering to the target 225 may continue. After the target 225 is rendered, the copy may then be composited back (e.g., copied back while optionally applying an effect) into the target 225. When compositing the copy back into the target 225, a post rendering effect may be applied.

Figure 2C:
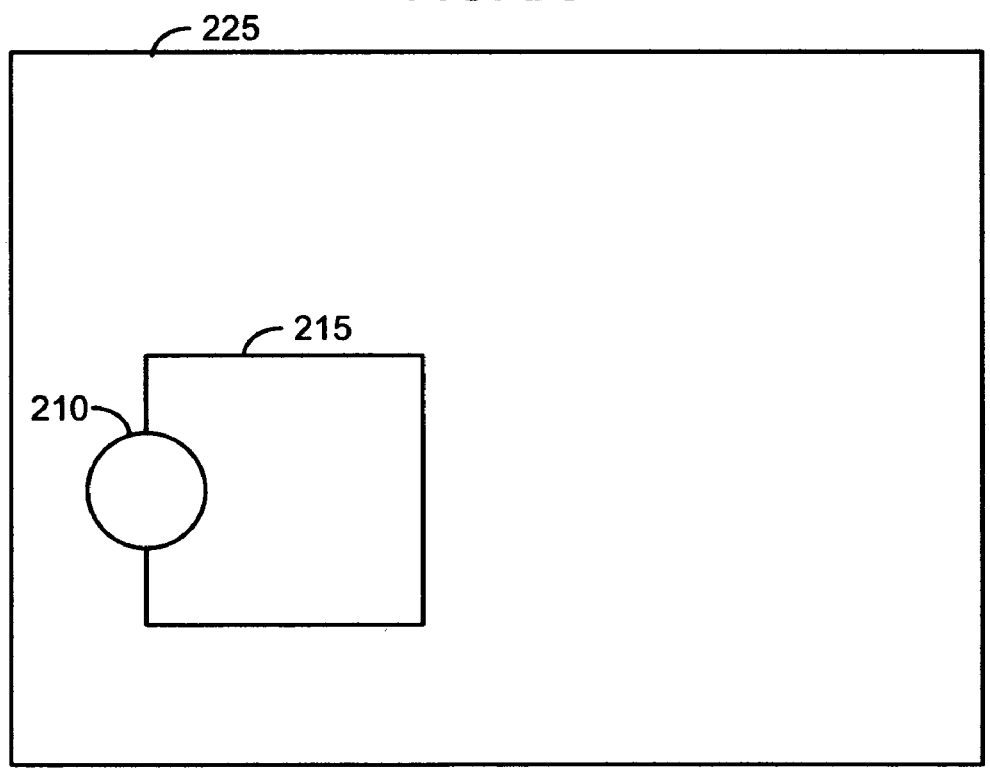
FIG. 2C is a block diagram representing a target in accordance with aspects of the subject matter described herein.

FIG. 2C is a block diagram representing a target in accordance with aspects of the subject matter described herein. During rendering, an area around the objects 210 and 215 may be copied to a memory location and then copied back. A post-rendering affect may be applied during copy-back if desired or needed.

Figure 3:
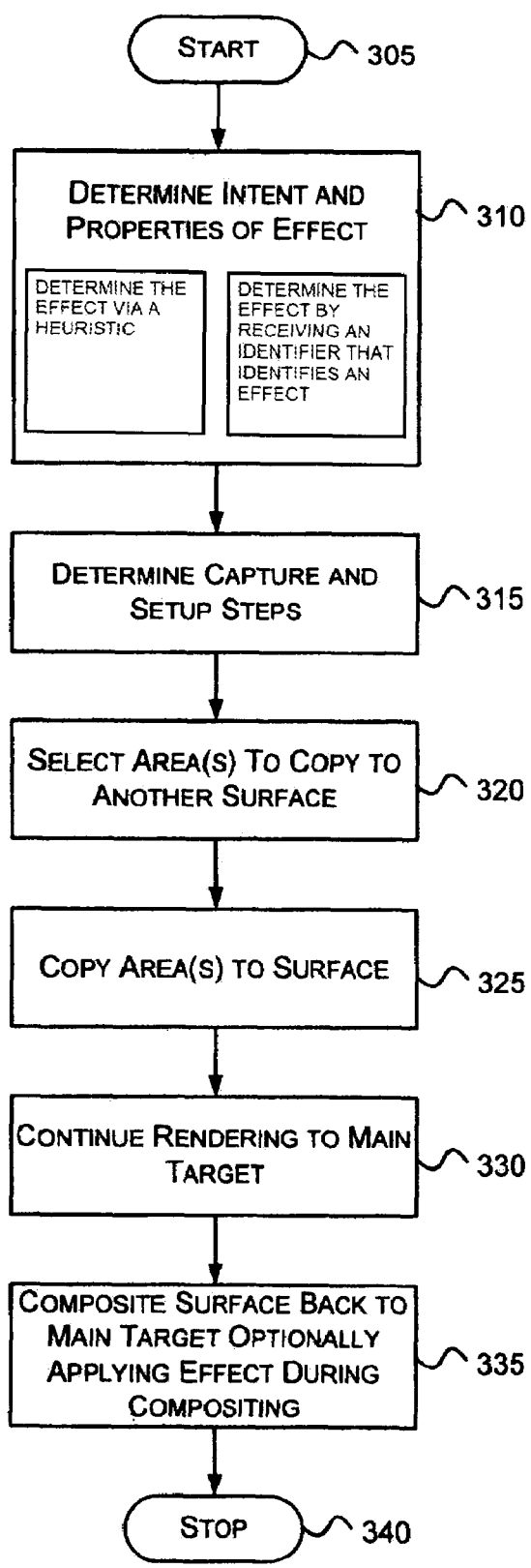
FIG. 3 is a flow diagram that generally represents actions that may occur in accordance with aspects of the subject matter described herein.

FIG. 3 is a flow diagram that generally represents actions that may occur in accordance with aspects of the subject matter described herein. At block 305, the actions start.

At block 310, a determination is performed as to the intent and properties of the effect. As an example of a property, a blur effect may have a property that it involves nine pixels for every rendered pixel. As examples of intent, an effect may be used to anti-alias pixels, change the transparency in some fashion, clip to a geometric mask, and other effects known to those skilled in the art. The intent of the effect may be thought of as the reason why the effect is applied.

The intent of the effect may be determined in various ways. For example, the intent of the effect may be determined via heuristics. For example, if the manipulation for each pixel involves other pixels, a blurring or sharpening intent may be inferred. As another example, an intent may also be determined via an identifier associated with the effect. The identifier may be passed via an API or method call, for example. In yet another example, the intent may be determined by the method called. For example, a call to a method associated with a blur effect likely indicates a blur intent.

At block 315, a determination is made as to capture and setup steps needed for the intent and properties of the effect. For example, a determination may involve determining an area affected by the effect. In an anti-aliased masking effect, for example, edges of mask(s) may be relevant whereas internal areas may not be relevant.

At block 320, areas of the target are selected to copy to another surface. At block 325, the areas are copied to the surface. At block 330, rendering continues to the main target. At block 335, the surface is copied back to the main target. While copying back the surface an effect may be applied.

At block 340, the actions stop.

Figure 4:
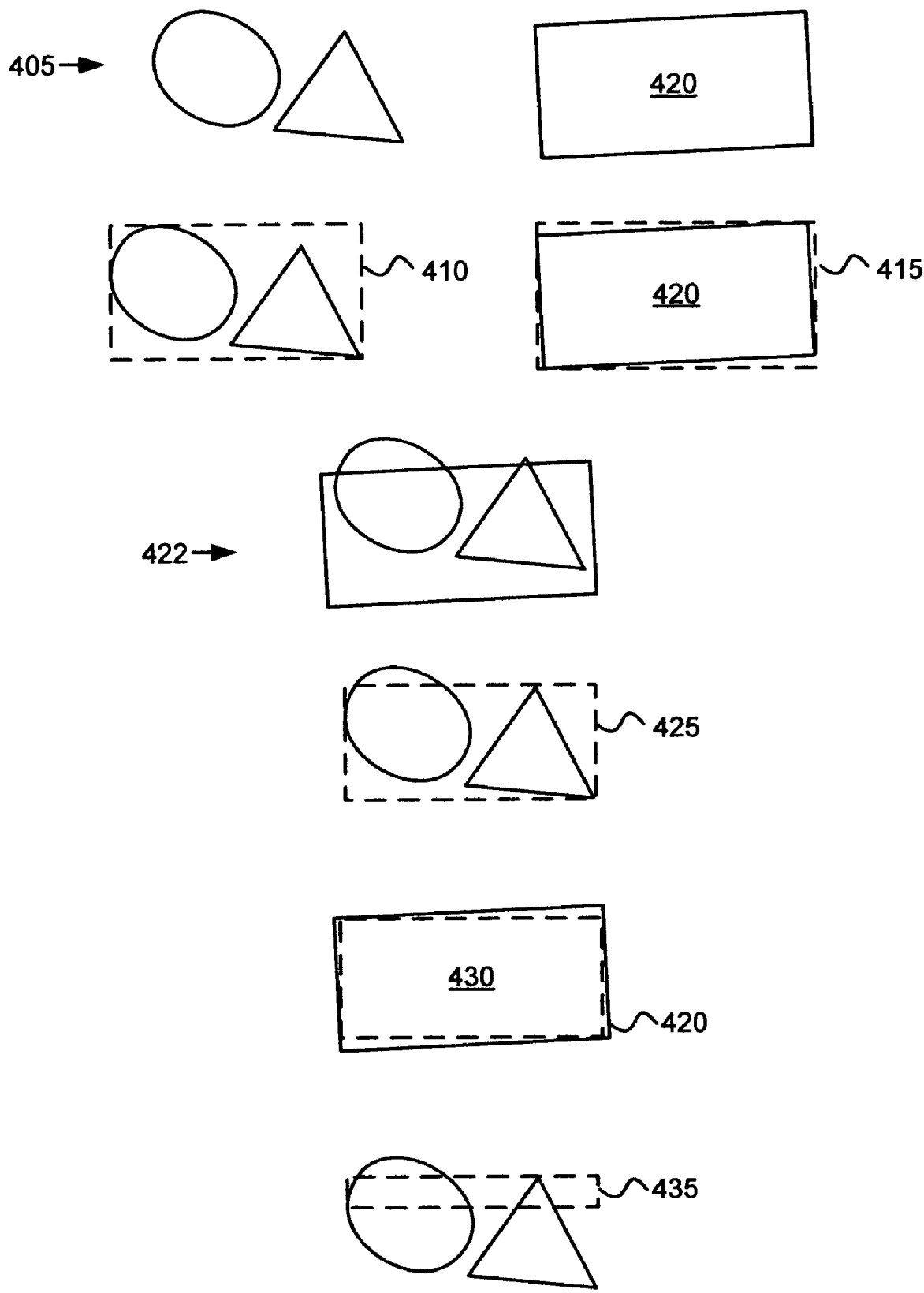
FIG. 4 is a block diagram that generally represents various actions that may occur in applying a geometric mask effect in accordance with aspects of the subject matter described herein.

FIG. 4 is a block diagram that generally represents various actions that may occur in applying a geometric mask effect in accordance with aspects of the subject matter described herein. A geometric mask effect may be used, for example, to clip objects of a layer.

In applying a geometric mask, a layer 405 upon which the mask is applied may include two shapes. When a program requests that a mask be applied, a determination may be made as to the intent (e.g., geometric mask) of the request as described previously.

Upon determining that the intent is to apply a geometric mask to the layer 405, an outer bound 415 of the geometric mask 420 and outer bound 410 of layer 405 may be found. Considering the relative positions 422 of the layer 405 and geometric mask 420, the outer bounds 410 and 415 may then be intersected to find an area of interest 425.

In addition, an inner bounds 430 of the geometric mask 420 may be found to determine an area that will not need manipulation. By intersecting the area of the outer bounds 415 that is outside the area of the inner bounds 430 with the outer bounds 410, an area 435 that needs to be copied may be found. This area 435 may then be copied to a surface and rendering may continue to the current target. Since a portion of layer 405 extends beyond the geometric mask outer bounds 415, the area of interest 425 should be used to constrain rendering of the layer 405.

After the rendering is completed, the area 435 copied to the surface may be composited with the target in accordance with the following formula:

$$T'=E\alpha*T+(1-E\alpha)*S$$

where T is target after the layer is rendered, T' is the target after the surface is composited back into the target, S is the surface, and E$\alpha$ is 1 inside the geometric mask 420 and 0 outside the geometric mask 420. Furthermore, E$\alpha$ may be any value from 0 to 1, which allows for an anti-aliased interpretation of the geometric mask sampling and may produce higher quality results than aliased masking (often referred to as clipping).

When a layer is opaque, a source over blend with alpha scale effect applied to the layer (also known as the source) may be defined as:

$$T'=E\alpha*L+(1-E\alpha)*T$$

where E$\alpha$ is the alpha effect, L is the layer, T is the current target and T' is the target that results after applying the alpha scale effect. An alpha effect is any function that operates on alpha. Note that typically the alpha scale effect is applied on a pixel-by-pixel basis. Thus, each of the variables above may reference the color and alpha values of a pixel.

When a layer is not opaque, a source over blend with alpha scale effect may be defined as:

$$T'=E\alpha*L+(1-E\alpha*L\alpha)*T$$

where L$\alpha$ is the alpha of the layer.

When applying an alpha effect in accordance with aspects of the subject matter described herein, the area of interest may be copied to a surface (S). Rendering may then continue on the main target until it is desired to composite the surface back to the main target. For example, source over blending of the layer may proceed as follows:

$$T'=L+(1-L\alpha)*T$$

Then, the target (now T') may be updated to T" as follows:

$$T''=E\alpha*T+(1-E\alpha)*S$$

In blend operations, some graphics rendering systems, however, may not allow a factor $E\alpha$ to be used with T' in the same operation in which $(1-E\alpha)$ is used with S. In such APIs, an alternative is to premultiply the $E\alpha$ into the T' before using a blend operation supported by such APIs as follows:

$$T'_{int}=0+E\alpha *T'$$

$$T''=(1-E\alpha)*S+1*T'_{int}$$

If the source S is opaque, more optimal actions may be taken when working with such APIs when compositing S back to the main target. For example, an intermediate source S' may be created (within texture pipeline) as follows:

$$S'=(1-E\alpha)*S$$

Then the final target may be updated as follows:

$$T'''=S'+(1-S\alpha)*T'$$

While some effects have been described above, it will be appreciated that other effects may also take advantage of aspects of the subject matter described herein. In essence any effect which can be generated by copying an area to a surface, continuing to render to the same target, and then compositing the surface back (with post-manipulation as needed) to the target may benefit from aspects of the subject matter described herein as changing targets may be an expensive operation.

Aspects of the subject matter described above may be performed by the video interface 190 and a program module of the program modules 136 described in conjunction with FIG. 1. The program module may include logic to perform actions described in conjunction with FIGS. 2A-2C, and 3-5. Furthermore, the program module may be comprised of multiple program segments (e.g., portions of code) arranged to communicate with each other during execution.

As can be seen from the foregoing detailed description, aspects have been described related to compositing rendering layers. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. In a graphics system used to rasterize scenes to a computer display, a storage medium having stored computer-executable instructions for performing a method for applying effects to a target during rasterization by compositing rendering layers, the method comprising:
    commencing to render a layer of a graphics scene to a target, wherein the layer includes one or more objects;
    during rendering, determining an effect that is to be applied to the target wherein the effect is applied while rendering the layer to the target;
    determining an area of the target to which the effect will be applied, wherein the area includes at least one of the one or more objects in the layer being rendered to the target;
    in response to determining the area and during the rendering of the layer to the target, copying the area of the target to a surface that is stored separately from the target;
    after copying the area to the surface, continuing to render the layer to the target without switching to the separated surface to render the effect to the area copied to the surface;
    while continuing to render the layer to the target, compositing the surface back to the target; and
    during compositing the surface back to the target, rendering the effect to the target at the area of the target to which the surface was composited.

2. The storage medium of claim 1, further comprising determining capture and setup steps based on the effect.

3. The storage medium of claim 2, wherein the area is determined based on the effect.

4. The storage medium of claim 1, further comprising determining an intent of the effect via a heuristic, and using the intent of the effect to determine the area.

5. The storage medium of claim 1, further comprising determining an intent of the effect by receiving an identifier that identifies the effect, and using the intent of the effect to determine the area.

6. In a graphics system used to rasterize scenes to a computer display, a method for applying effects to a target during rasterization by compositing rendering layers, the method comprising:
    commencing to render a layer of a graphics scene to a target, wherein the layer includes one or more objects, the rendering being performed by a processor;
    during rendering, determining an effect that is to be applied to the target wherein the effect is applied while rendering the layer to the target;
    determining an area of the target to which the effect will be applied, wherein the area includes at least one of the one or more objects in the layer being rendered to the target;
    in response to determining the area and during the rendering of the layer to the target, copying the area of the target to a surface that is stored in memory separately from the target;
    after copying the area to the surface, continuing to render the layer to the target without switching to the separated surface to render the effect to the area copied to the surface;
    while continuing to render the layer to the target, compositing the surface back to the target; and
    during compositing the surface back to the target, rendering the effect to the target at the area of the target to which the surface was composited.

7. The method of claim 6, wherein the effect comprises masking a layer with anti-aliased fidelity in the target and the area comprises edges of the mask.

8. The method of claim 6, wherein the effect comprises an alpha scale effect.

9. The method of claim 6, wherein the effect comprises a geometric mask effect.

10. The method of claim 6, wherein rendering the effect to the target at the area of the target to which the surface was composited comprises constraining rendering to an area indicated by the area.

11. The method of claim 6, wherein the area is reduced to remove portions not affected by the effect.

12. In a computing environment, an apparatus, comprising a processor; and
    system memory storing the followingl:
        a video interface arranged to accept rendering instructions; and
        a program module arranged to provide the instructions to the video interface and perform actions to apply effects to a target during rasterization by compositing rendering layers, the actions comprising:

commencing to render a layer of a graphics scene to a target, wherein the layer includes one or more objects;

during rendering, determining an effect that is to be applied to the target wherein the effect is applied while rendering the layer to the target;

determining an area of the target to which the effect will be applied, wherein the area includes at least one of the one or more objects in the layer being rendered to the target;

in response to determining the area and during the rendering of the layer to the target, copying the area of the target to a surface that is stored separately from the target;

after copying the area to the surface, continuing to render the layer to the target without switching to the separated surface to render the effect to the area copied to the surface;

while continuing to render the layer to the target, compositing the surface back to the target; and during compositing the surface back to the target, rendering the effect to the target at the area of the target to which the surface was composited.

13. The apparatus of claim 12, wherein the program module is comprised of multiple program segments arranged to communicate with each other.

14. The apparatus of claim 12, wherein the program module is further arranged to select the area based on the effect.

* * * * *